United States Patent
Harris

(10) Patent No.: US 8,082,592 B2
(45) Date of Patent: Dec. 20, 2011

(54) READ/WRITE ENCRYPTED MEDIA AND METHOD OF PLAYING

(75) Inventor: Scott C Harris, Rancho Santa Fe, CA (US)

(73) Assignee: Harris Technology, LLC, Rancho Santa Fe, CA (US)

( * ) Notice: Subject to any disclaimer, the term of this patent is extended or adjusted under 35 U.S.C. 154(b) by 993 days.

(21) Appl. No.: 12/013,434

(22) Filed: Jan. 12, 2008

(65) Prior Publication Data

US 2009/0180618 A1  Jul. 16, 2009

(51) Int. Cl.
*G06F 11/00* (2006.01)
(52) U.S. Cl. ............................. 726/33; 705/52; 380/232
(58) Field of Classification Search ............ 726/33
See application file for complete search history.

(56) References Cited

U.S. PATENT DOCUMENTS

| | | | | |
|---|---|---|---|---|
| 5,450,489 | A | * | 9/1995 | Ostrover et al. ............. 705/51 |
| 5,754,649 | A | * | 5/1998 | Ryan et al. ................. 380/203 |
| 5,857,020 | A | * | 1/1999 | Peterson, Jr. ............... 705/52 |
| 6,161,179 | A | * | 12/2000 | Seidel ...................... 713/168 |
| 7,693,795 | B2 | * | 4/2010 | Yamamichi et al. ......... 705/52 |
| 7,715,558 | B2 | * | 5/2010 | Yamamoto et al. ......... 380/201 |
| 7,861,312 | B2 | * | 12/2010 | Lee et al. .................. 726/27 |
| 2004/0218100 | A1 | * | 11/2004 | Staker et al. ............... 348/592 |
| 2006/0014510 | A1 | * | 1/2006 | Yamamoto et al. ......... 455/260 |
| 2008/0263579 | A1 | * | 10/2008 | Mears et al. ............... 725/9 |

* cited by examiner

*Primary Examiner* — Matthew Smithers
(74) *Attorney, Agent, or Firm* — Law Office of Scott C. Harris, Inc.

(57) ABSTRACT

A new media device including a decryption device that is operable to create a decryption key to read media. The decryption device is itself a read/write device that allows reducing or decrementing each time the decryption key is used.

22 Claims, 3 Drawing Sheets

READ/WRITE ENCRYPTED MEDIA AND METHOD OF PLAYING

BACKGROUND

Many different methods of delivering playable media to users have been suggested. Perhaps the most ubiquitous among such methods, is the DVD, and its follow on generation "Blue Ray". These disks include media thereon in an encrypted form.

In the DVD, the encryption key is also readable from the media so that a player can play the media to the user. Other more sophisticated forms of encryption and decryption have been used with new media techniques such as blue ray. Some, for example, hard-code a decryption key into the players.

Each of these, however, have their own host of disadvantages, and allow a sufficiently dedicated hacker to find the media decryption key and use it to play back the decrypted media. DVD-decryption programs can be downloaded, for example. The blue-ray decryption keys are often posted on the internet. All of these allow obtaining a surreptitious digital copy of the media being played.

Also, video recording devices, such as digital video recorders, may store media.

SUMMARY

Embodiments given herein disclose and show the use of a media element, such as a DVD or blue ray disk, or any other media element. The media element has playable information thereon, and at least part of the playable information is encrypted in a way that can not be played without a decryption key. In an embodiment, the separate read-write capable device stores decryption keys. In the embodiment, the key can only be used for a certain number of decryption events. Each "use" of the key causes information to be written on the device. This written information limits the uses of the decryption key as explained herein.

In one embodiment, parts of the media are unencrypted, allowing the unencrypted part to be played in any player, even when no decryption key is available. The parts may be previews, or low resolution versions of the media, parts of the media, or other limited parts of the media.

In one embodiment, the key can be used in only a specified number of playing devices. After that, the key can be regenerated, but no new keys for different players can be created.

Another embodiment describes how the player can surrender the key back to the media, so that a user can purchase a new player, and surrender the keys from their old player(s) in favor of the new player.

Other embodiments describe additional cryptographic functions.

BRIEF DESCRIPTION OF THE DRAWINGS in the drawings.

DETAILED DESCRIPTION

Figure 1:
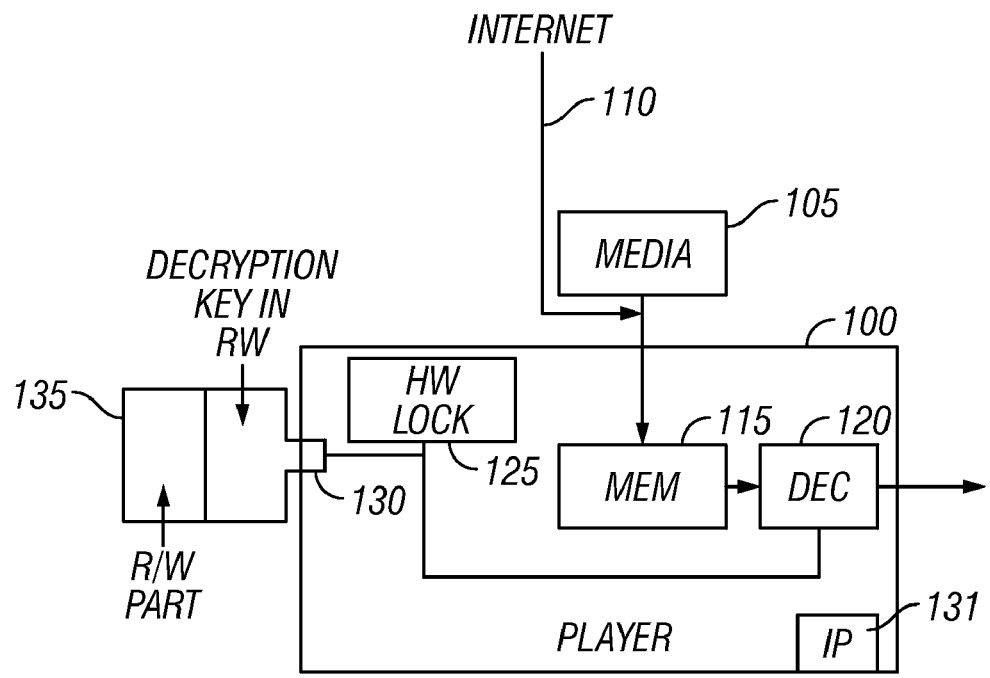
FIG. 1 shows a block diagram of a player with a key.

FIG. 1 shows media player 100 which operates according to the techniques disclosed herein. Media source 105 is shown as inserted media which may be media stored on a memory or the like. The media may also be received over the Internet shown at as 110. However received, the media is stored on a memory 115 for later playing. The stored media on the memory may be highly encrypted, for example using a 256 or 512 or 1024 or 2048 kb encryption key. This allows the media to be distributed by much less secure means, since receiving the media does not (necessarily) allow a user access to the contents of that media. For example, the media may be downloadable, may be distributed with print media such as providing a Dvd along with the Sunday paper, etc. The media player can also be a digital video recorder, for example, that can record media from a channel, e.g., airwaves, cable, satellite or other. A network based media player, e.g., that downloads media and/or obtains the media via a peer-to-peer technique is also usable for the embodiments disclosed herein.

As described herein, certain parts of the media may be playable without a key, but other parts require a key for playing.

The player is shown in FIG. 1. A decoder 120 decrypts the media according to a key. The key may also be stored in the memory 115 that is part of the player, or on the decryption device 135. An embodiment discloses that the key is located on the USB decryption device, and that the media cannot be played, or can only be played in a limited mode, unless the key is located in the device.

A hardware lock 125 is connected to and controlled by data from the USB port 130. Port 130 receives the decryption key device 135. An embodiment describes how the decryption device limits the number of devices that can carry out the decryption of the media.

Decryption key device 135 includes a one use or multiple use decryption key, on a read/write device. Each "use" of the decryption key may be formation of a key for a specific player, that allows that player to play the media. The key for the player may last forever, or may last for n uses (e.g., between 10 and 100 uses), or may last for one year on the specific player.

The key for a player can be formed using the device 135, and once the decryption key is formed, information is written on the device 135. This written information indicates that a key has been formed, and prevents the device 135 from forming another same decryption key, unless it has the capability to form another decryption key.

In one embodiment, the raw key information that is stored on the device 135 includes two parts—raw key information, and instructions, e.g., read only instructions, for how to combine the raw key information with hardware id from a player. The key information is maintained in a protected area within device 135, e.g., in a location that prevents it from being improperly read.

The device may be coded for one or two or three uses, each use allowing the media to be played in one specific player. The device may be programmed for some other number of players. However, each time the device is used to form an encryption key, an indication of that is written on the device. This decrements the number of allowable uses.

Figure 2:
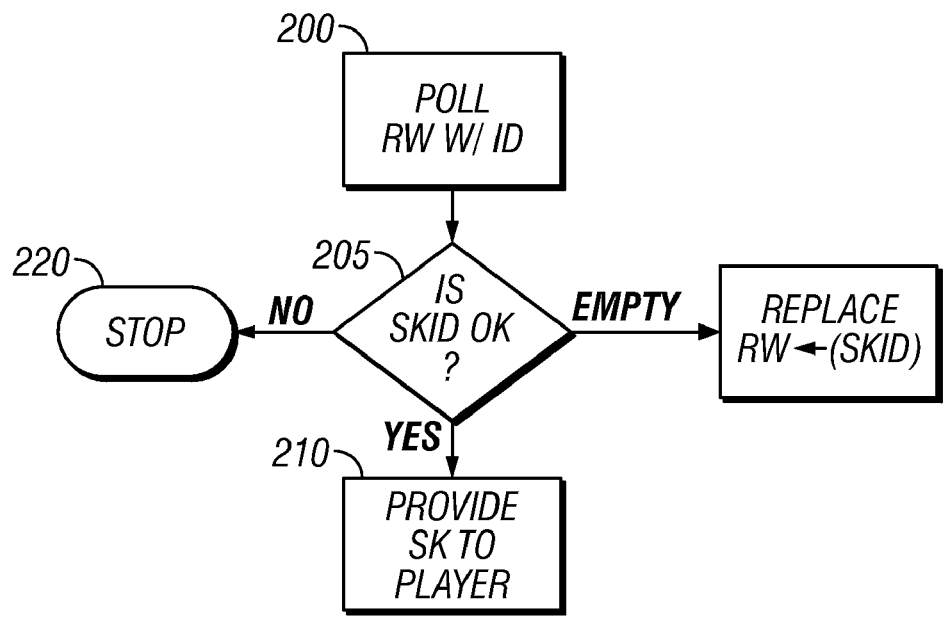
FIG. 2 shows a flowchart.

The operation proceeds according to the flowchart of FIG. 2.

At 200, the read/write device 135 is polled using a stored unique ID 131 within the player device 100.

The read/write device stores both information about keys that have already been produced, and information about how many, if any, "new" keys can be produced while staying within the allowable number of keys that was preprogrammed into the device 135.

Responsive to the poll, the RW device 135 returns information. If the ID code for the player matches the hardware code for a player already in the RW device, then the decryption key for that player is returned. That decryption key is keyed to the hardware code for the player doing the polling, and hence can only be use in that specific player that is doing the polling. Hence, that decryption key is returned to the player. This decryption key will only be allowed to operate the player if the "hardware lock" determines that the hardware ID in the code matches the hardware ID of the specific player.

If an existing key is not found, then the read write device 135 is checked to determine if it is authorized to produce any more keys. If so, then a message is returned to the user. The message may say "You have xxx remaining keys—would you like to create a new key for this new player?"

If the user answers yes, a concatenation key is formed. The concatenation key is formed of a cryptographic combination of a unique ID representing the player (e.g., a hardware ID for the player), and a key. Any cryptographic combination can be used for this purpose, and all are generically referred to herein as being a cryptographic combination. This can be as simple as placing two encrypted keys together, or more complicated such as a second encryption of the combination of keys.

The R/W device 135 stores key information that can be used to decrypt the media. However, this key information forms only a part of the decryption key this is used to form a concatenated stored key. In an embodiment, the hardware lock prevents a key from being used unless that key includes the hardware ID. Therefore, the total key includes the hardware ID and the stored key. Once formed, the new concatenated key is stored on the RW media in place of the original key.

The player may itself include a key, e.g., a symmetrical key, or a public/private key from a public private key system. The player may automatically provide its public key to any device that is connected to its USB port. In that embodiment, the concatenation key formed from the hardware ID and key can itself be encrypted using the public key of the player. In this case, only the player or some device that includes the private key associated with the public key from the player, can decrypt the concatenation key.

Alternatively, the new key can simply be stored on the RW device as concatenated with the hardware id. Since the new key is concatenated with the hardware ID, it cannot be used with some other hardware, and cannot be used to make a new key. Only stored, unconcatenated keys can be used to make new concatenated keys. Once formed, the concatenated keys can only be used on the same hardware that was used to initially create that key.

At 205, the system in the read/write device uses a stored program and processes the key, using either the processor in the player or a dedicated processor, to check the stored key ID (SKID) combination according to information in the read/write device. This checks to see if the read/write device is capable of creating an encryption key. If the read/write device still has encryption capability remaining, that it has not used up all of its stored keys, then the stored key and read/write device are used to create an encryption key at 210. The stored key is overwritten with the stored key plus ID concatenation. This is used according to an encryption engine to form a new key.

A decryption key includes both the stored key and also the ID of the device. The device stores the stored key plus ID concatenation, but provides the decryption key to the player this allows the player to read the media using the stored key ID. The hardware lock 125, however, prevents the stored key from being used unless the ID in the stored key ID concatenation matches the ID in the player.

If no stored decryption keys remain at 220, and no existing key matches the hardware ID, then the system is stopped.

The player can store the new decryption key-hardware ID concatenation, because that decryption key can be used only on the specific player. In addition, once the stored key on the USB device has been replaced by stored key plus hardware ID, that stored key can not be used on another device with a different hardware ID—it can only be regenerated for use on the same device. Therefore, only machines with IDs that comply with the ID 131 can use this encryption key. This can be used to backup the same device, but cannot be used to create new devices.

Figure 3:
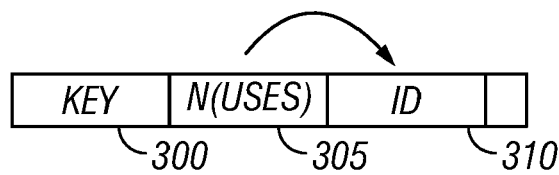
FIG. 3 illustrates a diagram of the key.

The decryption key may have unlimited uses, or can have a limited number of uses. The above has described that the single key is used and is replaced by the concatenation. FIG. 3 illustrates an alternative embodiment in which the key 300 is coded with a number of uses 305. The number of uses 305 is decremented each time an ID 310 is added. The key can be used to re-generate the decryption key for that same ID, but cannot be used when once the number of uses is exhausted.

A two-code key can be used to create decryption codes for two devices, for example, in any two devices that can play and decrypt the media.

The key can also be limited in the number of times that the media can be played or the amount of time that the media can be played. In this embodiment, the key can be used to play on the device an unlimited number of times. However, in another embodiment, the key might be coded with a number of plays, e.g., 20 or 50 or 100 plays. Each time the code is used, the stored "allowable number of plays" is decremented. The code might only be usable for a certain number of plays, for example 100 plays.

In different embodiments, the decryption key might be used in different ways. The media 105 may be totally encrypted, or may be encrypted in a way that limits the quality of the information that can be obtained by playing the media without the key. For example, certain frames may be out of order, and can only be played when the key is obtained. The key can be used to unlock additional features such as unlocking higher definition parts from the media.

In an embodiment, the hardware lock requires the key to be read before the media can be played or before part of the media can be played. Hence, this system can allow the media to be disseminated in whatever form, since the once-disseminated media is limited without the key—either it can not be played at all without the key, or can be played only in some limited way until the proper decryption key is obtained. This allows improved ways of disseminating the media, e.g., by the internet, by peer-to-peer, etc.

This system has the advantage of allowing new features that users might enjoy, making it more likely that users will accept this new feature. The media can be freely distributed, for example over the Internet or via the mail. The distributed media however, may be limited in what it can do. However, in one embodiment, the distributed media can be played in some fashion, even if only to show coming attractions, or only parts of the movie or only show low definition versions or analog only versions of the media. Some people will be satisfied with this playing of the media and happy that they can see some parts for free. It may also be possible to sell the media for a reduced price as a loss leader, and sell the decryption key that unlocks additional content for another price.

This system may also allow backwards compatibility, for example, old players may still be able to play the media in the limited form. New players with the improved decryption capabilities may be able to play it better.

In a downloadable media player embodiment, the downloadable media may be stored in a way that allows it to be played once, completely, or in a limited way, prior to requiring the special codes to play it. For example, the media may be stored encrypted, and provided with a single use code. This allows the media to be played once. In order for the user to keep the media, that is to play it again or to record it to some other medium such as a DVD, they need to purchase a decryption key.

Figure 4A:
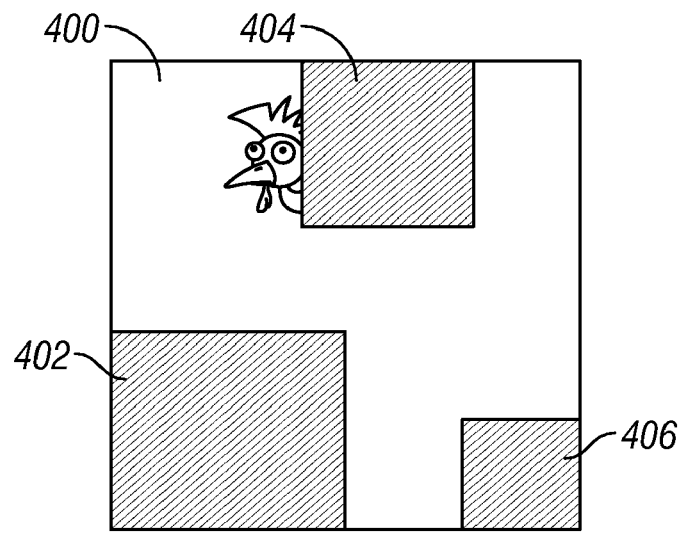
FIGS. 4A and 4B show different ways of limiting the played video.

According to another embodiment, the media can be played either once or many times in a limited play mode. The limited media may be played with certain areas of the video, for example, hashed out using blockage parts. FIG. 4A shows how the video frame 400 can have blocked parts 402, 404, 406. The blockage parts can be constant, or can move on the screen. Parts of the video media being played can be seen. Other parts of the video media cannot be seen.

The media may be playable with or without sound when done in this way.

Figure 4B:
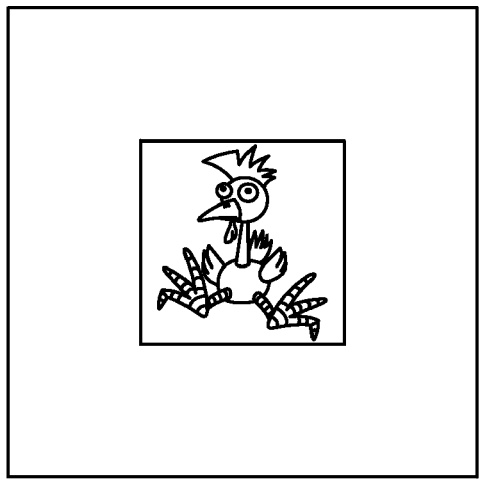

Another embodiment may allow the media to be played on only a very small part of the area of the screen. For example, FIG. 4B shows how the media can be reduced to approximately $\frac{1}{8}^{th}$ of the area of the screen. The reduced area video is played when a proper decryption key is not available. This can allow the users to view the media, but to experience it only in a very limited way until the key is purchased. It can also have a message, e.g., saying "you can buy a key to see more". Even this limited viewing mode can be limited, for example to one use or some other number of uses. Each play may cause a decrement of an allowable play counter that may be included as part of the media.

Other ways of playing reduced versions of the media may include allowing the media to be played at only standard resolution as compared with high-resolution, or having other shaped bars such as 402. The bars can extend from top to bottom or diagonally, blocking portions of the screen from being seen.

In the embodiment, it is important that the cryptographic codes which are released are concatenated with ID information from the player when they are properly concatenated. Once concatenated, the cryptographic codes are in essence keyed to the player. They cannot be used on any player other than the one specific player that they are keyed to. The term concatenated, as used herein, denotes that the player ID and the decryption code, are both present in the decryption key. In one embodiment, the decryption key may itself be encrypted in a way that requires the player ID to decrypt the key. In another embodiment, the decryption key is combined with the player ID, in a way that prevents finding the decryption key unless the player itself is reading the key. The players may, for example, include hardware locks that prevent them from reading a key unless they have the proper player identification therein.

Figure 5:
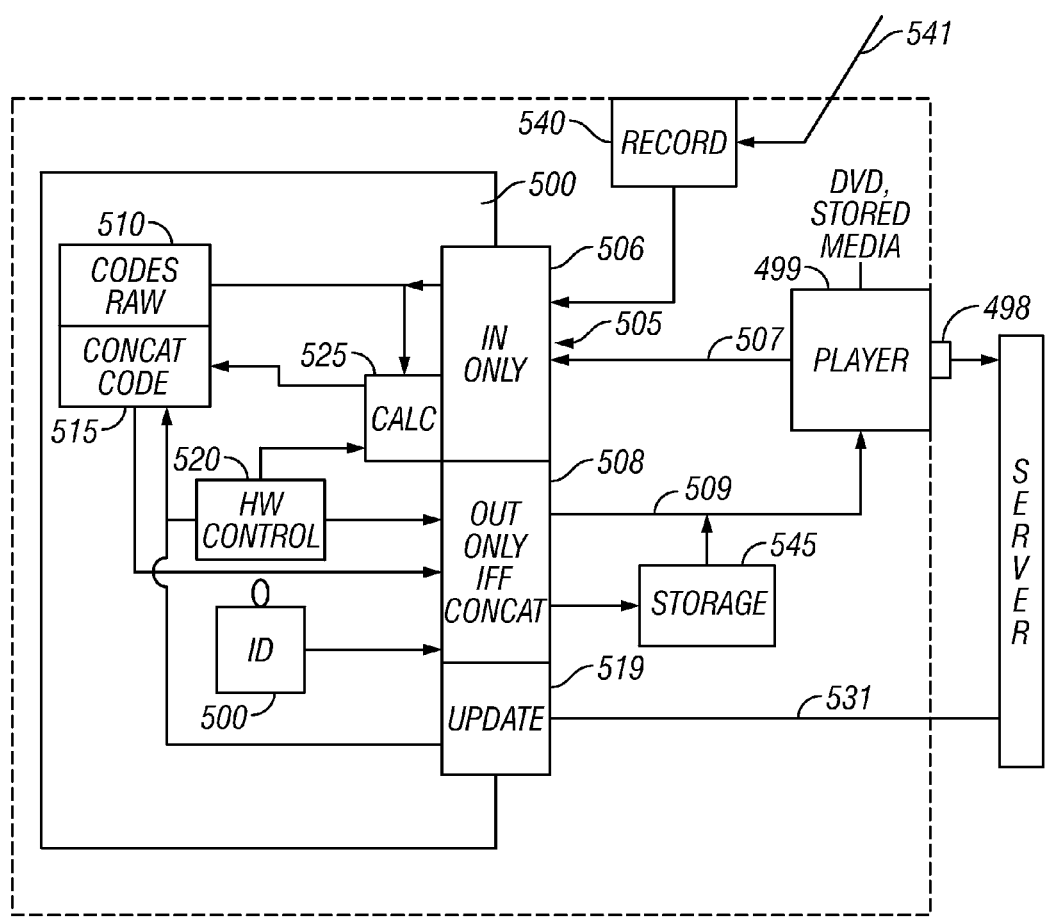
FIG. 5 shows a block diagram of a player with a cryptographic boundary.

However, in at least one embodiment, the raw codes may be stored either on the read write memory, or in the player itself. FIG. 5 illustrates how a cryptographic boundary/barrier can be used to prevent stored codes from being surreptitiously removed from the player device.

The device shown as 500 includes a cryptographic barrier shown generally as 505. The codes themselves are stored on the secure side of the cryptographic barrier. Raw codes 510 are stored in the player. These codes may be stored when the player is initially made, or may be loaded in the device from a secure medium once trust is established. The storage unit may also store "concatenated" codes 515, which may be concatenated as described above, or in some other way modified in a way such that 1) they do not provide information from which the raw codes can be obtained, and 2) they are individually keyed to a specific player or player group so that they cannot be used on other players.

A hardware control module 520 which may be a hard wired controller operating according to a prestored routine that can not be updated by any means to prevent spoofing. The hardware controller 520 controls a calculator part 525 which may be a cryptographic calculator that carries out calculations necessary to allow the codes to be formed.

Hardware controller 520 also controls ingress and egress across the cryptographic boundary. A cryptographic boundary in this embodiment is formed with an input only port 506. This may receive codes 507 from the specific player, e.g., codes from the media, or may receive downloaded decryption codes. The output portion 508 is output only, and outputs only secure codes, e.g., codes which have been concatenated with player information. An update portion 519 may also be provided to allow updating the codes only in 510/515. For example, the raw decryption codes may go out of date, or a user can download a new concatenated code. The connection 531 to the update module 519 may be, for example, an Internet connection.

For example, since the concatenated codes can only be used in a specific player, the player module 499 may also have an Internet connection 498. This may allow the user to enter payment information, and transmit that to a remote server. The remote server may store player codes, or may receive encrypted versions of the player code along with the payment information, or unencrypted player information. Once receiving the payment information, the server returns a code 531 over the Internet. The code 531 is personalized or concatenated in a way that prevents the code from being used in any player other than the specific player (here 499)

Concatenation lock 509 may use a number of different techniques to determine if the code being output is truly personalized to the specific player. Non personalized codes are blocked by the cryptographic boundary.

For example, the concatenation lock may count bits, where a concatenated code may have 456 bits, and the non-concatenated code may only have 256 bits. A rule may be set for the encryption that prevents the codes from having more than a certain number (n) of same-value bits, and the counting of bits counts the number of bits that are present, so long as no n bits are the same value.

The above has described storing raw codes on the player, which can be done if the codes are prestored with the player. However, another embodiment may download codes that are pre-concatenated, and hence can only be used with the one player. When this is done, there is no need for a cryptographic boundary, since the stored codes are personalized to the one player. Someone surreptitiously obtaining the codes cannot actually use these codes in another player, and hence the cryptographic boundary becomes unnecessary.

Another embodiment describes a new way of using a digital video recorder. According to this new embodiment of digital video recorder, information is received over the channel, e.g., recorded from a TV channel as conventional. The information as received is encrypted prior to storage, using a secret encryption key that is within the unit. FIG. 5 illustrates the recording module 540 which receives information to be recorded 541. The recording module sends an output stream of information through the cryptographic boundary to be encrypted using one of the raw codes 510. The encrypted information is also sent through the encryption boundary, to be stored by a storage unit 545. Alternatively, the storage unit 545 can be inside the encryption boundary. The storage unit 545 can be played by the player 499, using either a concatenated code or the like.

According to this embodiment, the code used to store the program allows a certain number of free plays of the media program. For example, the program can be played twice. However, since programs are often not played exactly beginning to end, the code may allow 120 minutes of actual playing of the program. After that time of playing, the stored program cannot be played again without downloading a new key.

The ID code 550 for the media player may also be stored inside the cryptographic boundary. The ID code is preferably burned into a chip or the like in a way that prevents the ID code from ever being changed, for example, by permanently changing the condition of fusible links.

The FIG. 5 player may also operate similar to the FIG. 1 unit to obtain keys from a read-write unit, and may have a USB port for this purpose.

In one embodiment, both a low resolution version of the video, and a higher resolution version of the video may both be stored as part of the media, e.g., on a disk, USB stick or hard drive. The low resolution version of the video is unencrypted, and may be played in its entirety. A higher resolution version of the video is encrypted. However, the whole higher resolution version of the video is stored on the media. Another embodiment may store information indicative of how to increase the resolution of the video on the media, so that are played information includes the lower resolution video enhanced by the higher resolution information.

The general structure and techniques, and more specific embodiments which can be used to effect different ways of carrying out the more general goals are described herein.

Although only a few embodiments have been disclosed in detail above, other embodiments are possible and the inventor intends these to be encompassed within this specification. The specification describes specific examples to accomplish a more general goal that may be accomplished in another way. This disclosure is intended to be exemplary, and the claims are intended to cover any modification or alternative which might be predictable to a person having ordinary skill in the art. For example, other devices are intended to be encompassed and different kinds of media can be played. The unit can also be a cell phone that allows making communication over the channel over which the media is received.

Also, the inventor intends that only those claims which use the words "means for" are intended to be interpreted under 35 USC 112, sixth paragraph. Moreover, no limitations from the specification are intended to be read into any claims, unless those limitations are expressly included in the claims. The communicator described herein may include any kind of computer, either general purpose, or some specific purpose computer such as a workstation. The computer may be an Intel (e.g., Pentium or Core 2 duo) or AMD based computer, running Windows XP or Linux, or may be a Macintosh computer.

The programs may be written in C or Python, or Java, Brew or any other programming language. The programs may be resident on a storage medium, e.g., magnetic or optical, e.g. the computer hard drive, a removable disk or media such as a memory stick or SD media, wired or wireless network based or Bluetooth based Network Attached Storage (NAS), or other removable medium or other removable medium. The programs may also be run over a network, for example, with a server or other machine sending signals to the local machine, which allows the local machine to carry out the operations described herein.

Where a specific numerical value is mentioned herein, it should be considered that the value may be increased or decreased by 20%, while still staying within the teachings of the present application, unless some different range is specifically mentioned. Where a specified logical sense is used, the opposite logical sense is also intended to be encompassed.

What is claimed is:

1. A method, comprising:
    storing first decryption information on a read/write device, said first decryption information associated with a first decrypt ability count, that indicates a first quantity of device-specific decryption keys that can be created from said first decryption information;
    reading at least part of said first decryption information from said read/write device; and
    responsive to said reading, writing information to said read/write device that indicates a second decrypt ability count, which represents a second quantity of device specific decryption keys, where said second quantity is a less quantity than said first quantity, where the less quantity of device specific decryption keys reduces an ability of said read/write device to allow subsequent reading of said decryption information,
    responsive to said reading, also writing information to said read/write device indicating a device specific decryption information that was created using said first decryption information, and where said device specific decryption information is usable without being limited by said first or second decrypt ability count.

2. A method as in claim 1, further comprising
    receiving hardware identification information to be associated with the decryption information, said hardware identification information associated with a specific device;
    creating said device-specific decryption key for said specific device based on both of said hardware identification and said decryption information; and
    using said device-specific decryption key to decrypt and play media that includes video thereon.

3. A method as in claim 2, wherein said creating comprises forming a cryptographic combination between said hardware identification and said decryption key is stored in said read/write device as said device specific decryption key and is usable to create a decryption key for said specific device.

4. A method as in claim 1, further comprising storing a number of times that the decryption key can be used to play said media, and decrementing said number of times each time the media is played.

5. A method as in claim 4, further comprising storing a total amount of play time that the decryption key can be used to play said media, and decrementing said total amount of time as the media is played.

6. A method as in claim 1, further comprising establishing an encryption boundary that prevents certain encryption information from being removed from the read/write device.

7. A method, comprising:
    obtaining an encrypted media;
    storing the encrypted media in a first media player;
    downloading a key which can only be used in said first media player, and which provides no information that can be used to decrypt the media in any media player other than the first media player; and
    using said key to play said encrypted media in said first media player, wherein said encrypted media is playable without said key but only in a limited way ,wherein said limited way comprises allowing said media to be played only at a standard resolution; and further comprising allowing media with the key can be played at a higher resolution.

8. A method as in claim 7, further comprising sending a unique identification indicative of the player to a remote server, and receiving said key, from the remote server.

9. A method as in claim 7, wherein said key can only be used for a limited number of times of playing said media.

10. A method as in claim 7, wherein said key can only be used for a limited amount of time of playing said media.

11. A method, comprising:
obtaining an encrypted media;
storing the encrypted media in a first media player;
downloading a key which can only be used in said first media player, and which provides no information that can be used to decrypt the media in any media player other than the first media player; and
using said key to play said encrypted media in said first media player, wherein said encrypted media is playable without said key but only in a limited way, wherein said limited way comprises blocking only a portion of a video portion of the media from being seen.

12. A method, comprising:
obtaining an encrypted media;
storing the encrypted media in a first media player;
downloading a key which can only be used in said first media player, and which provides no information that can be used to decrypt the media in any media player other than the first media player; and
using said key to play said encrypted media in said first media player, wherein said media is stored within a player wherein said media is downloaded over a channel and stored within a player in an encrypted form.

13. A method as in claim 12, wherein said key includes a decryption portion that is cryptographically combined with a unique hardware ID indicative of the player.

14. A media player, comprising:
a media player, that receives media to be played;
a unique identification code, that is stored in the media player in a way that prevents the unique identification code from being changed;
a decryption unit, which allows decryption of the media received via the media receiver, only if some aspect of the decryption unit matches to the unique identification code; and
a media playing module, that plays the media, wherein said media received by the media player is partly unencrypted, and the part that is unencrypted can be played without decryption by said decryption unit, wherein said part that is unencrypted includes a low resolution version of the media, and the part that is encrypted includes a higher resolution version of the media.

15. A player as in claim 14, wherein said media includes a video.

16. A player as in claim 14, further comprising a key storage part that stores decryption keys for said decryption unit.

17. A player as in claim 16, further comprising a cryptographic boundary, and wherein said key storage part is protected against tampering by said cryptographic boundary.

18. A media player, comprising:
a media playing part, that receives and plays media, said media playing part receiving a decryption key to play an encrypted media;
a storage part for said decryption key; and
a cryptographic boundary, protecting said storage part against providing said decryption keys to an area outside the boundary.

19. A player as in claim 18, wherein said storage part stores individualized keys that are only useful in one specific media player, and not in other media players.

20. A player as in claim 19, wherein said cryptographic boundary allows only said individualized keys to pass out of the cryptographic boundary.

21. A media player, comprising:
a media playing part, that receives and plays media, said media playing part receiving a decryption key to play an encrypted media;
a storage part for said decryption key; and
a cryptographic boundary, protecting said storage part against providing said decryption keys to an area outside the boundary, wherein said cryptographic boundary allows key updates to pass in to the media playing part.

22. A player as in claim 21, wherein said cryptographic boundary prevents program updates from passing in to the media playing part.

\* \* \* \* \*